July 1, 1924.
J. BLACKBURN
1,499,336
DIFFERENTIAL DRIVE CLUTCH FOR AUTOMOBILES
Filed Jan. 12, 1920   3 Sheets-Sheet 1
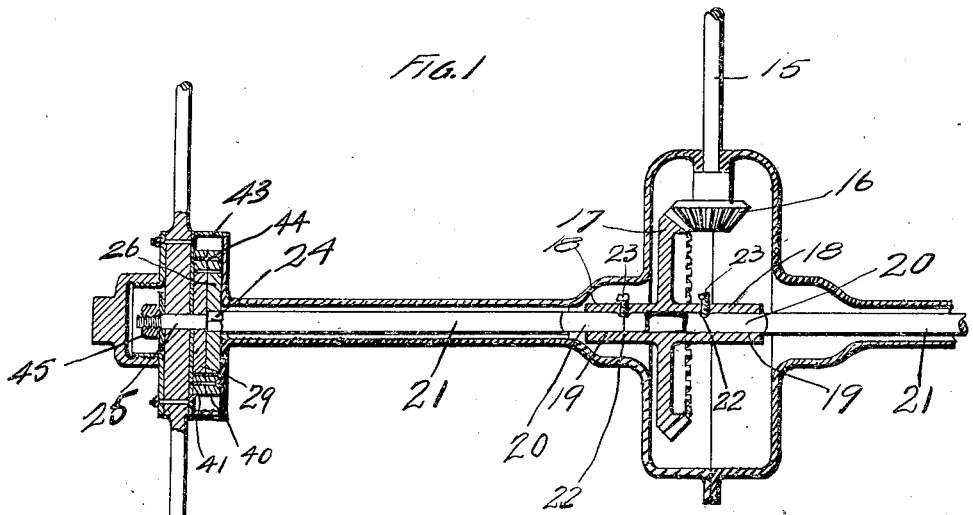
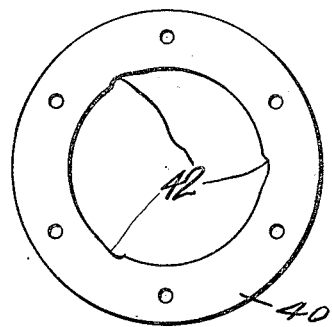
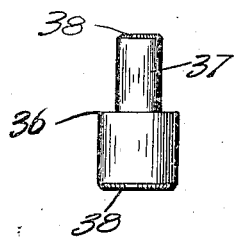
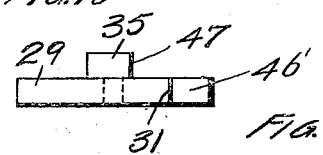
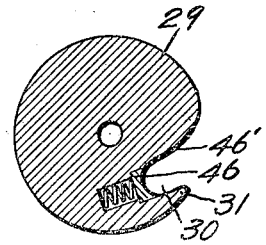
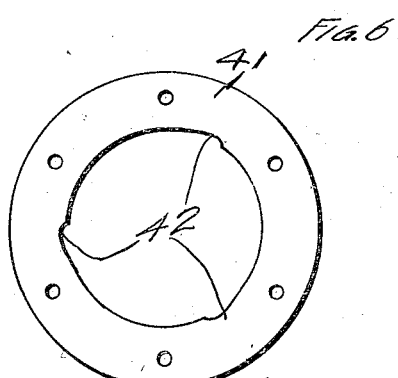
INVENTOR
JASPER BLACKBURN
By Edward E. Longan
ATTY.

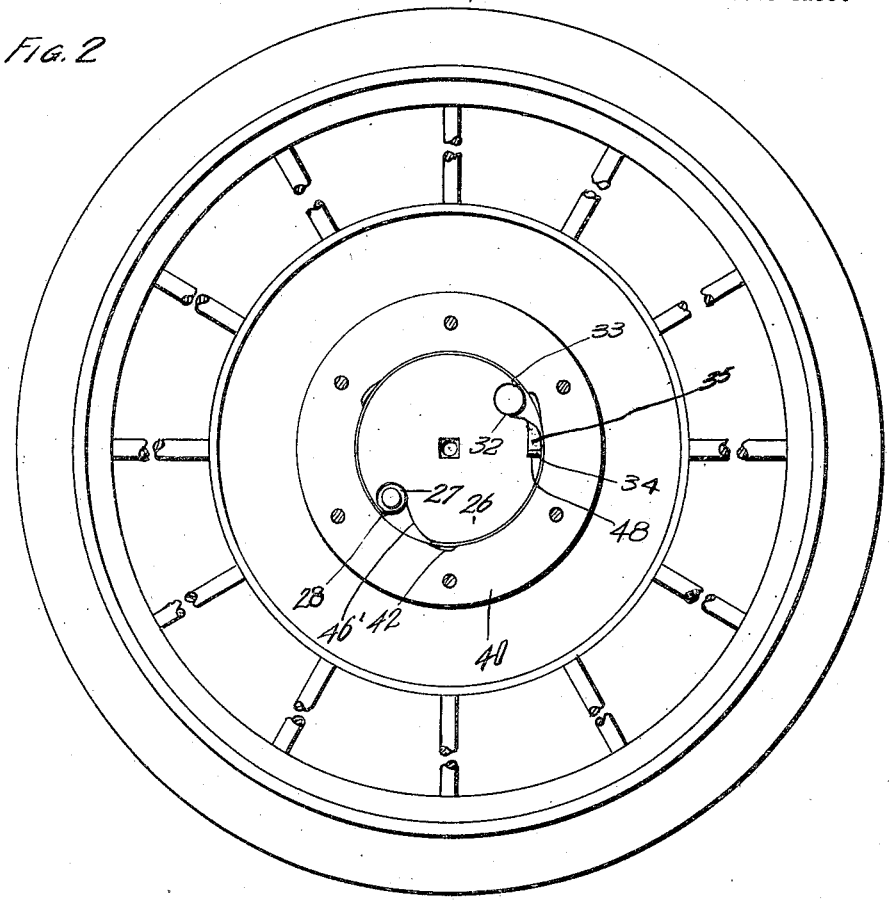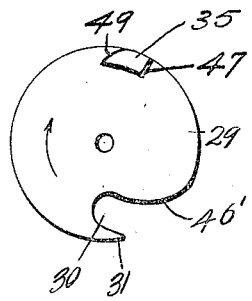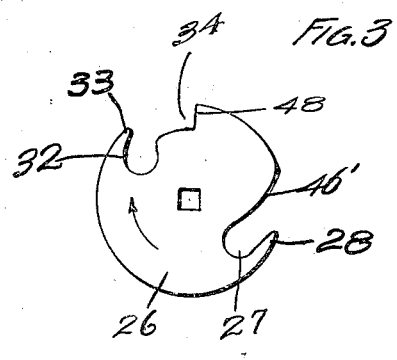

Patented July 1, 1924.

1,499,336

UNITED STATES PATENT OFFICE.

JASPER BLACKBURN, OF WEBSTER GROVES, MISSOURI.

DIFFERENTIAL DRIVE CLUTCH FOR AUTOMOBILES.

Application filed January 12, 1920. Serial No. 350,783.

*To all whom it may concern:*

Be it known that I, JASPER BLACKBURN, a citizen of the United States of America, and a resident of Webster Groves, in the county of St. Louis and State of Missouri, have invented certain new and useful Improvements in Differential Drive Clutches for Automobiles, of which the following is a specification containing a full, clear, and exact description, reference being had to the accompanying drawings, forming a part thereof.

This invention relates to improvements in differential drive clutches for automobiles, and has for its primary object a driving mechanism which is attached to each of the rear wheels thereby doing away with the differential gear made use of in the present type of drives.

A further object is to construct a differential clutch for automobiles which is attached directly to the wheels and within the brake drum, and is so arranged that one of the wheels may travel faster than the other, as frequently occurs especially in rounding a corner.

In the construction of my device,

Fig. 1 is a sectional view showing the main drive shaft and my improvements attached to one of the wheels;

Fig. 2 an enlarged view of one of the wheels with my device in position;

Fig. 3 a view of the positive driven disc;

Fig. 4 a view of the idle or loosely mounted driving disc;

Figs. 5 and 6 are views showing the recesses in which the roller pawls controlled by the discs of Figs. 3 and 4 grip for driving the car forward and backward;

Fig. 7 is a side view of one of the roller pawls, and

Fig. 8 a view of the other roller pawl made use of.

Fig. 9 is a vertical sectional view of one of the discs showing the spring actuated means for forcing the roller pawls outwardly.

Fig. 10 is a side elevation of the loose disc.

Figure 11:
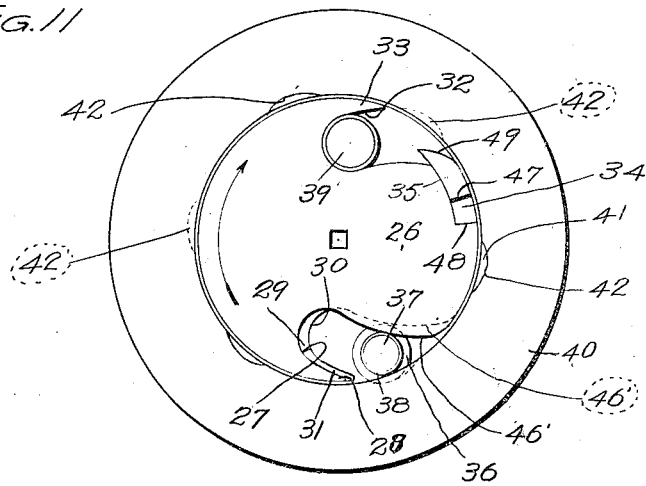

Fig. 11 is an enlarged view of one side of the differential, showing the forward drive.

Figure 12:
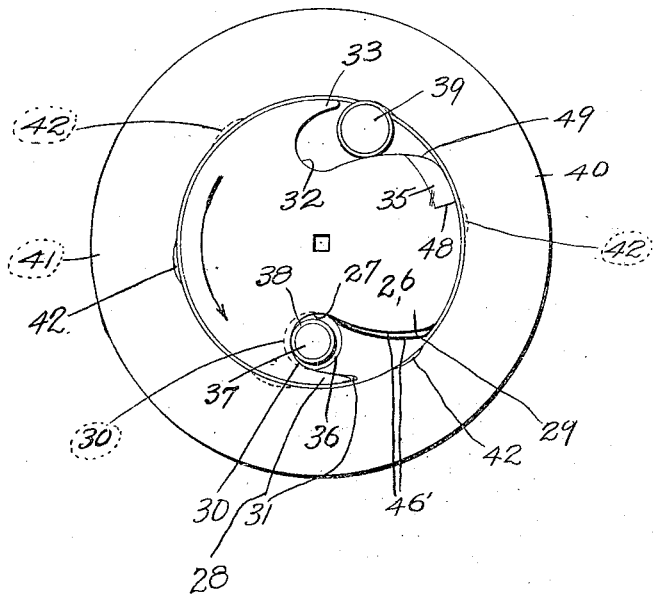

Fig. 12 is a similar view, showing the rearward drive.

In the construction of my device, 15 represents the propeller shaft of an automobile, to the end of which is attached a bevel gear 16 which meshes with the bevel gear 17. This bevel gear 17 is provided with elongated hubs 18, these hubs having a central rectangular opening, as indicated by the numeral 19. Within this opening the rectangular ends 20 of the axle 21 are inserted, each of the rectangular ends being provided with a depression 22, these serving as a seat for the set screw 23. My object in forming these recesses in the axle 21 is to prevent its withdrawal or shifting backward and forward after the set screw has been secured. I may, however, use a pin which is driven entirely through the hub 18 and through the axle, but in any event it is desirable to have the end of the shaft formed rectangular so as to take away the shearing tendency.

The opposite end of the axle 21 is provided with a rectangular portion 24 and a reduced cylindrical portion 25. Over the rectangular portion 24 is placed a disc 26, this disc being provided with a recess 27. This recess is so shaped as to form a hook 28. The purpose of this hook will be subsequently explained in detail.

Over the cylindrical portion 25 of the shaft is placed a disc 29 in which is formed a similar recess 30 and hook 31. This recess and hook is adapted to register with the recess 27 and hook 28. In the disc 26 is also formed a recess 32 and hook 33, and opposite the hook 33 is formed an additional recess 34 into which recess the block 35 secured to the disc 29 fits.

In the recesses 27 and 30 the roller pawl 36 is placed, this roller pawl being provided with a reduced portion 37, and has both of its ends chamfered, as indicated by the numeral 38.

This chamfering is intended to reduce the riding surface of the roller and reduce friction. Within the recess 32 is placed the roller 39 which is likewise chamfered.

As will be seen from the drawings, the roller pawl 36 is made of sufficient length to extend through both of the discs 26 and 29, while the roller 39 extends only through the disc 26. Surrounding the discs 29 and 26 are rings 40 and 41, these rings having recesses 42 formed in the inner peripheries, the recesses in one ring extending in an opposite direction to the recesses formed in the other ring, so as to take care of the forward and backward drive. These rings 40 and 41 are mounted within the brake drum 43 of an automobile, and are secured thereto by means of bolts 44.

The nut 45 secures the wheel and the driving mechanism to the axle 21. This being a common construction, it will not be described in detail.

If desired, I may place a spring actuated shoe, as indicated by the numeral 46, back of each roller pawl so as to have a positive outward movement against each one of the pawls.

The operation of my device is as follows:
After the engine has been started, and transmission thrown in, the axle 21 is caused to revolve. In the forward movement this revolution will be in the direction of the arrow, shown in Fig. 11. This movement will first rotate the disc 26, and cause the cam or inclined face 46' to contact with the reduced portion 37 of the roller 36. This will have a tendency to force the roller outward, and at the same time, interlock the discs 26 and 29. The two discs are now carried in the direction indicated by the arrow in Fig. 11, which rotation causes the roller 36 to move outward on the inclined faces 46' of these discs. This outward movement will continue until the enlarged portion of the roller 36 enters one of the recesses 42 in the ring 41. These recesses limit the outward movement of the roller 36, and prevent the disc 29 from turning any further and normally holds the roller in the recess and against accidental dislodgment. The reduced portion 37 resting against the inclined face 46' of the disc 26, receives the torque from the axle 21, when the car is started forward. In the event that one of the wheels rolls faster than the other, the roller pawl on that wheel is carried forward in its recess, faster than the discs revolve, which permits it to enter the recesses formed in said discs, thus disengaging that wheel from the driving axle, and allowing it to travel at a greater rate of speed, while the remaining wheel still receives power from the axle. In reversing the car, the discs are driven in the direction indicated by the arrow in Fig.
12. The disc 26 commences to revolve first, allowing the hook 28 to grip the reduced portion of the roller pawl, which has a tendency to force the roller forward, and remove it from the recess 42. At this period, the shoulder 48 contacts with the shoulder 47, placing both discs in operation. This movement not alone draws out the roller 36 completely from the recesses 42, but also seats it in the recesses 30 and 27. When this is done the continued rotation of the discs forces the roller 39 to ride outward on the inclined face 49, until it is seated on one of the recesses 42, after which the wheels are driven by the axle. The same compensation for moving one wheel faster is allowed in the rearward drive, but in the rearward drive the projection 35 takes the place of the reduced portion 37 of the roller 36 to lock the two discs together. This locking of the discs is necessary, since where no provision is made for locking the disks in the rearward drive, the disc 29 would have a tendency to twist the roller 36, and cause it to jam in the recesses formed in the discs 26 and 29, and thereby prevent the roller 36 from becoming readily forced outward when the forward drive is used. As before stated, the reduced portion 37 of the roller 36, is for the purpose of binding the two discs together in the forward drive, and still allow a certain amount of lost movement to the disc 26, which is essential so that one roller can be disengaged from its driving position before the other one commences to come into action.

Having fully described my invention, what I claim is:—

1. In a differential drive for automobiles wherein an axle is provided, and wheels loosely mounted on the axle and adapted to revolve freely thereon, a clutch member comprising a housing secured to a wheel, a disc loosely mounted within the housing adjacent said wheel, a disc rigidly secured to the axle and mounted adjacent the first mentioned disc and located within the housing, roller pawls carried by said discs and adapted to engage with recesses formed in the housing when the axle is revolved in either direction, said roller pawls adapted to be disengaged from the housing by the partial rotation of the fixed disc in relation to the loose disc, and means located on the loose disc for limiting the amount of rotation of the fixed disc in relation thereto.

2. In a differential drive for automobiles which employs an axle, and a traction wheel loosely mounted at each end thereof, a clutch mechanism comprising a ring shaped housing secured to a wheel, said ring shaped housing having recesses formed on the inner periphery thereof and extending partially the width of the housing and in opposite directions, a pair of discs located within the housing, one of which is rigidly secured to the axle, the other loosely mounted thereon, a projection formed on the loosely mounted disc and adapted to enter a recess formed on the rigid disc, undercut recesses formed in the periphery of each of said discs, roller pawls mounted in said recesses, said roller pawls adapted to engage the recesses formed in the housing for causing the wheel to rotate when driving in a forward or rearward direction, said roller pawls and recesses being so arranged as to allow the wheel to travel faster than the speed of the axle.

3. In a differential drive for automobiles in which an axle having wheels rotatably mounted on each end is employed, a clutch mechanism comprising a housing secured to a wheel, a disc loosely mounted on the shaft within the housing and adjacent the wheel, a disc rigidly secured to the axle and mounted adjacent the first mentioned disc and within the housing, roller pawls carried by said discs and adapted to engage with recesses formed in the housing when the axle is revolved in either direction, said roller pawls adapted to be disengaged from the housing by the partial rotation of the fixed disc in relation to the loose disc, means located on the loose disc for limiting the amount of rotation of the fixed disc in relation thereto, and means carried by the discs for withdrawing one of the roller pawls and projecting the other outward when the movement of the axle is reversed.

4. In a differential drive for motor vehicles employing an axle capable of being driven and wheels mounted on each end of said axle, which wheels are free to rotate, a clutch mechanism comprising a ring shaped housing secured to a wheel, recesses formed on the inner periphery of said housing and extending partially the width of the housing and in opposite directions, a pair of discs located within the housing, one of said discs being rigidly secured to the axle, the other loosely mounted thereon and located between the rigid disc and the wheel, a projection formed on the loosely mounted disc and adapted to enter a recess formed in the rigidly mounted disc, said discs provided on their periphery with undercut recesses, roller pawls mounted in said recesses, said roller pawls adapted to be forced out and connect the recesses formed in the housing for driving the vehicle in a forward or rearward direction, said roller pawls and recesses being so arranged as to allow the wheel to travel faster than the speed of the axle, and means carried by the discs for withdrawing one of the roller pawls when the movement of the axle is reversed.

In testimony whereof, I have signed my name to this specification.

JASPER BLACKBURN.